July 1, 1930.   R. W. SHAFOR ET AL   1,769,469
PRECIPITATION PROCESS
Filed July 19, 1924

INVENTORS
R. W. Shafor
A. A. Nees
A. J. Brown
BY
ATTORNEY.

Patented July 1, 1930

1,769,469

UNITED STATES PATENT OFFICE

RALPH W. SHAFOR, ALPHEUS R. NEES, AND ROBERT J. BROWN, OF DENVER, COLORADO

PRECIPITATION PROCESS

Application filed July 19, 1924. Serial No. 727,088.

Our invention relates to a method of recovering sugar from molasses commonly known in the beet sugar industry as the Steffens process and it bears more particularly on the step of the process in which the sugar contents of a mother liquor known as "cold waste water", are recovered by forming a precipitate of the lime and sucrose in the liquor, commonly referred to as the "hot saccharate precipitate".

It is the primary object of the present invention to facilitate and expedite the recovery of the sugar contents of the cold waste liquor obtained in the Steffens process of treating molasses, by an operation in which the precipitate of lime and sucrose is produced under certain physical conditions which greatly increase the rate of sedimentation of the precipitated particles in the final step of separating the precipitate from the mother liquor.

The above stated result is obtained by causing the sucrose and lime to form into crystals or flocs of comparatively large size while they are being precipitated under the influence of heat, and the formation of the larger crystals is produced by suitable dilution of the material under treatment, in a continuous operation.

Figure 1:
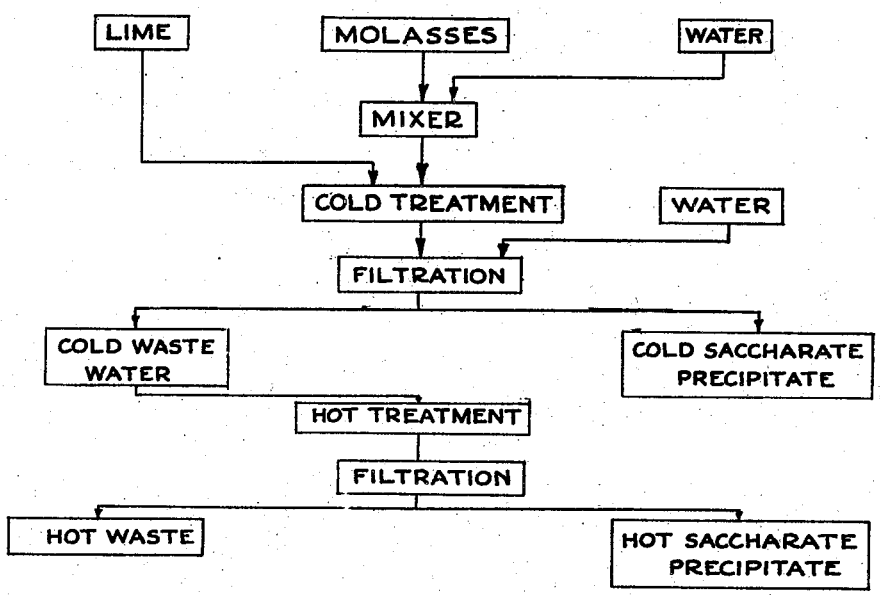
Figure 2:
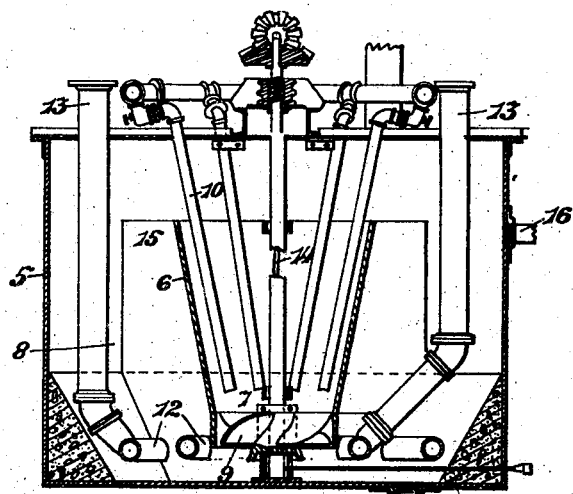

In order to facilitate the detailed explanation of our improved process and of the actions and results obtained therein, we have shown in Figure 1 of the accompanying drawings a diagrammatical representation of the Steffens process of recovering sugar from molasses, in which our improved method of producing the "hot saccharate precipitate" is included; and Figure 2 represents in vertical section an apparatus suitable for carrying the method into effect.

Referring to Figure 1 of the drawings, the beet molasses obtained as a by-product during crystallization of beet sugar from impure solutions of the sugar in the main beet sugar refining system, are diluted with water and mixed while cooled with powdered calcium-oxide to produce a precipitate of tri-calcium saccharate $(3CaO.C_{12}H_{22}O_{11})$.

The precipitate is subsequently separated from the mother liquor known as the cold waste water. This cold waste water usually contains in addition to impurities, from 0.5% to 1.0% sugar and some lime and in order to recover this sugar, which is probably in the form of a soluble calcium saccharate, it is precipitated as an insoluble calcium saccharate by heating the waste water to a temperature of from 75° to 85° C. and subsequently separated from its mother liquor by filtration or sedimentation or a combination of both.

The present invention relates to the last mentioned precipitation step of the process, and its main object is as stated hereinbefore, to facilitate and expedite the final separation by which the precipitated sugar is recovered from the liquor.

By the way of further explanation, it may be stated that our improved process takes the place of either of two methods which heretofore were generally employed to recover the sugar-contents of the cold waste waters.

One of these methods commonly known as the "batch process" consists in heating the solution in a tank usually equipped with a stirring device, the heat being preferably applied by means of steam introduced directly into the solution; and the other method consists in causing the solution to flow progressively from one to another of a series of two or more tanks and heating the tanks by introduced steam in such a mannner that the temperature of the contents of the tanks is gradually increased from the first tank into which the cold waste is originally fed, to the last tank of the series which is heated to the usual maximum temperature of from 80° to 85° C.

In both methods the heat precipitates the sucrose and lime contained in the cold waste, in small particles which are subsequently separated from the mother liquor by filtration or sedimentation but owing to the fineness of the particles, their separation is a difficult, costly and slow procedure, as is indicated by the fact that the average precipitate settles at a rate but seldom exceeding three to four feet per hour.

By the use of our improved method of forming the precipitate, the size of the particles is greatly increased and their separation from the liquor is proportionately accelerated. In carrying our invention into effect, the cold waste water is diluted with twenty or more equal volumes of mother liquor from the hot saccharate precipitation reaction, and the mixture is heated to the usual temperature of from 80° to 85° C.

The concentration of the precipitable constituents of the cold waste residuum of the Steffens process, is approximately 1% of the material by weight and if one volume of this is diluted with, for example, 20 volumes of barren solution obtained in a prior precipitation action, the concentration of the precipitable constituents of the pregnant solution is lowered in the mixture to approximately 0.05% by weight. Owing to this lower concentration a lesser number of precipitate nuclei are formed when the mixture is subjected to the precipitating heat, and each nucleus will separately increase in size until the prescipitating reaction is completed.

The consequently increased rate of sedimentation of the precipitated particles obviously facilitates and expedites their subsequent separation from the mother liquor and the improved process of forming the precipitate therefor results in economy in installation, maintenance and operation of the required apparatus and in greater equipment efficiency while it permits a higher recovery of granulated sugar per pound of sugar precipitated.

It has been found in actual practice that the rate of sedimentation of particles precipitated under the conditions of our improved process, may range from 10 feet per hour up to 25 feet per hour.

The term "barren solution" as employed in this description refers to a solution substantially free from precipitable substances although it may, and in practice, often does contain quantities of one or both of the components of the pregnant solution, sugar and lime, which under the imposed conditions are not precipitated. It follows that the "barren solution" may contain lime and sugar which under different conditions might be precipitated and that since all of the precipitate may not be immediately discharged, it may also contain an amount of precipitated matter. The presence of these substances, however, does not noticeably interfere with the present process and the solution may be correctly defined as being barren for the purpose to be attained.

As in the prior methods of forming the hot saccharate precipitate hereinbefore described, the solution is heated preferably by the introduction of live steam. It is obvious that this steam will to some extent dilute the inflowing material but this dilution is merely incidental and not sufficient to produce the results attained in the present process. Moreover, it is highly advantageous that the dilutant should be a barren solution obtained from a prior precipitation and it will be understood that the dilution step of the process herein described and included in the claims refers only to a degree of dilution sufficient to produce the desired size of the precipitated particles.

In order to render the process continuous, we have combined with a continuous feed of pregnant material, a concurrent discharge of barren solution carrying the precipitate in suspension. The continuous process requires the constant presence of a quantity of barren solution into which the pregnant solution is introduced in comparatively small quantities compensated by the concurrent discharge of liquor and precipitate, and it is from a practical point of view desirable that mechanical means be provided to effect a thorough intermixture of the pregnant liquor with the barren liquor in a circulatory movement of the latter.

The apparatus illustrated in Figure 2 of the drawings provides a simple and effective medium to conduct the continuous process as hereinabove described.

A tank 5 is by means of an open-ended funnel 6 divided into a central mixing zone 7 and a surrounding annular precipitation zone 8. A rotary ship propeller 9 in the lower end-portion of the funnel is adapted to effect a circulatory movement of a liquid in the tank upwardly in the precipitating zone and downwardly through the funnel, and the cold waste is continuously introduced into the funnel immediately above the propeller through a number of valve-controlled pipes 10.

The precipitating zone is heated by steam introduced through perforated circular pipes 12 in connection with upwardly ranging feed pipes 13, and radial baffles 14 and 15 in the funnel and the precipitation zone prevent the material from swirling in a horizontal direction.

An outlet 16 in the outer wall of the tank provides an overflow through which the surplus liquor and suspended precipitate are discharged.

In the operation of the apparatus, the tank is filled to the level determined by its overflow with barren solution obtained by the precipitation of sugar and lime from a volume of cold waste water with which the tank is initially charged.

After the tank is thus supplied with a barren solution containing precipitated but practically no precipitable matter, fresh cold waste is introduced into the mixing zone 7 through the pipes 10 while the propeller produces a circulating movement of the liquor in the tank as hereinbefore described.

The mixture of pregnant cold waste and barren solution is heated in the precipitation zone to the required temperature of from 80° to 85° C. with the result that the precipitable matter of the cold waste, distributed in a mixture of larger volume is precipitated in crystals or flocs which owing to the lower concentration are increased in size.

The surplus liquor and precipitate are continuously discharged through the overflow opening 16 so that subject to a continuous feed, the process of forming the hot saccharate precipitate is carried on without interruption.

In order to minimize precipitation by the heat of the stream of barren liquor in the funnel before the cold waste entering the mixing zone through the pipes 10, is thoroughly diluted it is desirable that the feed be entered into the circulating stream in as close proximity to the mixing zone defined by the space around the propeller, as is practical and that immediately upon diffusion of the feed the stream be caused to enter the precipitation zone.

It will be evident that the precipitating action is governed by the velocity of the circulating stream in ratio to the quantity of cold waste entered in the stream in a given period of time and to the degree of heat imparted to the mixture by the steam introduced into the precipitation zone through the perforated pipes and that in consequence the process is under perfect control of the operator and may be regulated at will in accordance with varying conditions.

A stream-velocity of 800 cubic feet per minute, with a feed velocity of approximately 40 cubic feet per minute in a diluting liquor 20 times its volume and a heat of from 80° to 85° C. have produced highly satisfactory results under normal conditions.

Having thus described our invention, what we claim and desire to secure by Letters Patent is:

1. The process of precipitating precipitable matter in cold waste water, consisting in diluting the waste water to reduce the concentration of precipitable matter contained therein to one-twentieth or less of its original concentration, and subjecting the mixture to a precipitating heat.

2. The process of precipitating precipitable matter in cold waste water, consisting in mixing and diluting the waste water with twenty or more times its volume of a comparatively barren solution, said barren solution being adapted to induce the formation of crystals or flocs in the mixture when the latter is heated to effect a precipitation of the solution-contents, the crystals or flocs functioning to increase the rate of sedimentation of the precipitate, and then subjecting the mixture to a precipitating heat.

3. The process of precipitating precipitable matter in cold waste water, consisting in mixing and diluting the waste water with a comparatively barren solution containing non-sucrose impurities, said barren solution being adapted to induce the formation of crystals or flocs in the mixture when the latter is heated to effect a precipitation of the solution-contents, the crystals or flocs functioning to increase the rate of sedimentation of the precipitate, and subjecting the mixture to a precipitating heat.

4. The process of precipitating precipitable matter in cold waste water, consisting in mixing and diluting the waste water with a larger volume of a comparatively barren solution, said barren solution being adapted to induce the formation of crystals or flocs in the mixture when the latter is heated to effect a precipitation of the solution-contents, the crystals or flocs functioning to increase the rate of sedimentation of the precipitate, and subjecting the mixture to a precipitating heat.

5. The process of precipitating precipitable matter in cold waste water, consisting in the dilution with the aid of mechanical intermixing of the waste water with a comparatively barren solution, said barren solution being adapted to induce the formation of crystals or flocs in the mixture when the latter is heated to effect a precipitation of the solution-contents, the crystals or flocs functioning to increase the rate of sedimentation of the precipitate, and subjecting the mixture to a precipitating heat.

6. The process of precipitating precipitable matter in cold waste water, consisting in feeding the waste water into a passing current of a comparatively barren solution, said barren solution being adapted to induce the formation of crystals or flocs in the mixture when the latter is heated to effect a precipitation of the solution-contents, the crystals or flocs functioning to increase the rate of sedimentation of the precipitate, and subjecting the mixture to a precipitating heat.

7. The process of precipitating precipitable matter in cold waste water, consisting in feeding the waste water into a mechanically moved current of comparatively barren solution, said barren solution being adapted to induce the formation of crystals or flocs in the mixture when the latter is heated to effect a precipitation of the solution-contents, the crystals or flocs functioning to increase the rate of sedimentation of the precipitate, and subjecting the mixture to a precipitating heat.

8. The process of precipitating precipitable matter in cold waste water, consisting in feeding the waste water at a plurality of points into a moving current of comparatively barren solution, said barren solution being adapted to induce the formation of crystals or flocs in the mixture when the latter is heated to effect a precipitation of the solution-contents, the crystals or flocs functioning to increase the rate of sedimentation of the precipitate, and subjecting the mixture to a precipitating heat.

9. The process of precipitating precipitable matter in cold waste water, consisting in feeding the waste water at a plurality of points into a mechanically agitated current of comparatively barren solution, said barren solution being adapted to induce the formation of crystals or flocs in the mixture when the latter is heated to effect a precipitation of the solution-contents, the crystals or flocs functioning to increase the rate of sedimentation of the precipitate, and subjecting the mixture to a precipitating heat.

10. The process of precipitating precipitable matter in cold waste water, consisting in mixing and diluting the waste water with a hot saccharate precipitate solution, said solution being adapted to induce the formation of crystals or flocs in the mixture when the latter is heated to effect a precipitation of the solution contents, the crystals or flocs functioning to increase the rate of sedimentation of the precipitate, and subjecting the mixture to a precipitating heat.

11. The process of precipitating the precipitable lime from a solution, consisting in mixing and diluting the solution with a solution containing dissolved lime, said solution being adapted to induce the formation of crystals or flocs in the mixture when the latter is heated to effect a precipitation of the solution-contents, the crystals or flocs functioning to increase the rate of sedimentation of the precipitate, and subjecting the mixture to a precipitating heat.

In testimony whereof we have affixed our signatures.

RALPH W. SHAFOR.
ALPHEUS R. NEES.
ROBERT J. BROWN.